(12) United States Patent
Seo et al.

(10) Patent No.: US 7,848,617 B2
(45) Date of Patent: Dec. 7, 2010

(54) RECORDING MEDIUM, METHOD, AND APPARATUS FOR REPRODUCING TEXT SUBTITLE STREAMS

(75) Inventors: Kang Soo Seo, Anyang-si (KR); Jea Yong Yoo, Seoul (KR); Byung Jin Kim, Seongnam-si (KR)

(73) Assignee: LG Electronics, Inc., Seoul (KR)

( * ) Notice: Subject to any disclaimer, the term of this patent is extended or adjusted under 35 U.S.C. 154(b) by 1024 days.

(21) Appl. No.: 11/087,808

(22) Filed: Mar. 24, 2005

(65) Prior Publication Data
US 2005/0213942 A1 Sep. 29, 2005

(30) Foreign Application Priority Data
Mar. 26, 2004 (KR) .................. 10-2004-0020890
Mar. 31, 2004 (KR) .................. 10-2004-0022251

(51) Int. Cl.
H04N 7/26 (2006.01)
H04N 5/91 (2006.01)
(52) U.S. Cl. ........................................ 386/124; 386/46
(58) Field of Classification Search ........... 386/46, 386/125, 126
See application file for complete search history.

(56) References Cited

U.S. PATENT DOCUMENTS

| | | | |
|---|---|---|---|
| 5,459,824 A | 10/1995 | Kashiwazaki | |
| 5,847,770 A | 12/1998 | Yagasaki | |
| 5,854,873 A * | 12/1998 | Mori et al. ........... | 386/92 |
| 5,999,225 A | 12/1999 | Yagasaki et al. | |
| 7,050,109 B2 | 5/2006 | Safadi et al. | |
| 2003/0012558 A1 * | 1/2003 | Kim et al. ............. | 386/97 |
| 2003/0099464 A1 | 5/2003 | Oh et al. | |
| 2003/0227565 A1 | 12/2003 | Hamilton et al. | |
| 2004/0044964 A1 * | 3/2004 | Martens et al. ........ | 715/517 |
| 2004/0071453 A1 * | 4/2004 | Valderas .............. | 386/125 |

(Continued)

FOREIGN PATENT DOCUMENTS

EP 1 145 218 10/2001

(Continued)

OTHER PUBLICATIONS

"Digital Video Broadcasting (DVB); Subtitling Systems", ETSI EN 300 743 V1.2.1. (Oct. 2002) European Standard.

(Continued)

*Primary Examiner*—Marsha D Banks Harold
*Assistant Examiner*—Oluwaseun A Adegeye
(74) *Attorney, Agent, or Firm*—Harness, Dickey & Pierce, P.L.C.

(57) ABSTRACT

A recording medium, method, and apparatus for reproducing text subtitle streams are disclosed. A buffer initially preloads a text subtitle stream including a dialog style segment defining a group of region styles and first and second dialog presentation segments. A text subtitle decoder initially presents a first region of dialog text included in the first dialog presentation segment in a graphics plane and reads a continuous presentation flag included in the second dialog presentation segment, which includes a second region of dialog text. The text subtitle decoder presents the second region of dialog text by preserving the presentation of the first region of dialog text in the graphics plane if the continuous segment indicates that continuous presentation is required between the first and second regions of the dialog text.

37 Claims, 20 Drawing Sheets

U.S. PATENT DOCUMENTS

2005/0105891 A1   5/2005   Kang et al.

FOREIGN PATENT DOCUMENTS

| | | |
|---|---|---|
| EP | 1 400 968 A2 | 3/2004 |
| JP | 08-102922 | 4/1996 |
| JP | 2000-285646 | 10/2000 |
| JP | 2007-525904 | 9/2007 |
| KR | 10-2003-0022390 A | 3/2003 |
| KR | 10-2003-0061953 | 7/2003 |
| RU | 2 129 758 | 4/1999 |
| RU | 2006120480 | 12/2007 |
| WO | WO 00/28518 | 5/2000 |
| WO | WO 2004/025452 | 3/2004 |
| WO | WO 2005/045835 A1 | 5/2005 |
| WO | WO 2005/074400 A2 | 8/2005 |
| WO | WO 2005/083708 A1 | 9/2005 |
| WO | WO 2005/088635 | 9/2005 |
| WO | WO 2005/091728 A2 | 10/2005 |

OTHER PUBLICATIONS

"IEC 62216-1" International Standard, E-Book (Draft Version 2.0.2), International Electrotechnical Commission, pp. 2-121, 2001.
Office Action issued Aug. 14, 2009 by the European Patent Office in counterpart European Patent Application No. 05 721 968.5.
Decision on Grant issued Jul. 28, 2009 by the Russian Patent Office in counterpart Russian Patent Application No. 2006137708/28 (with English language translation).
Decision on Grant issued May 25, 2009 by the Russian Patent Office in counterpart Russian Patent Application No. 2006137720/28 (with English language translation).
Office Action issued May 21, 2009 by the USPTO in counterpart U.S. App. No. 11/070,242.
Office Action issued Apr. 2, 2009 by the Russian Patent Office in counterpart Russian Patent Application No. 2006137708/28 (with English language translation).
Office Action issued May 21, 2009 by the USPTO in counterpart U.S. Appl. No. 11/070,242.
Office Action issued Jul. 18, 2008 by the European Patent Office in counterpart EP Application No. 05 721 968.5-2210.
Office Action issued Jun. 27, 2008 by the Malaysian Patent Office in counterpart Malaysian Patent Application No. PI 20051316.
Office Action issued Mar. 3, 2009 by the Russian Patent Office in counterpart Russian Patent Application No. 2006137720/28 (English language translation thereof).
Japanese Office Action dated Dec. 25, 2009 for corresponding Application No. 2007-504883.
Office Action issued Dec. 13, 2007 by the European Patent Office in counterpart European Patent Application No. 05 721 893.5-2210.
Office Action issued Dec. 13, 2007 by the European Patent Office in counterpart European Patent Application No. 05 721 968.5-2210.

* cited by examiner

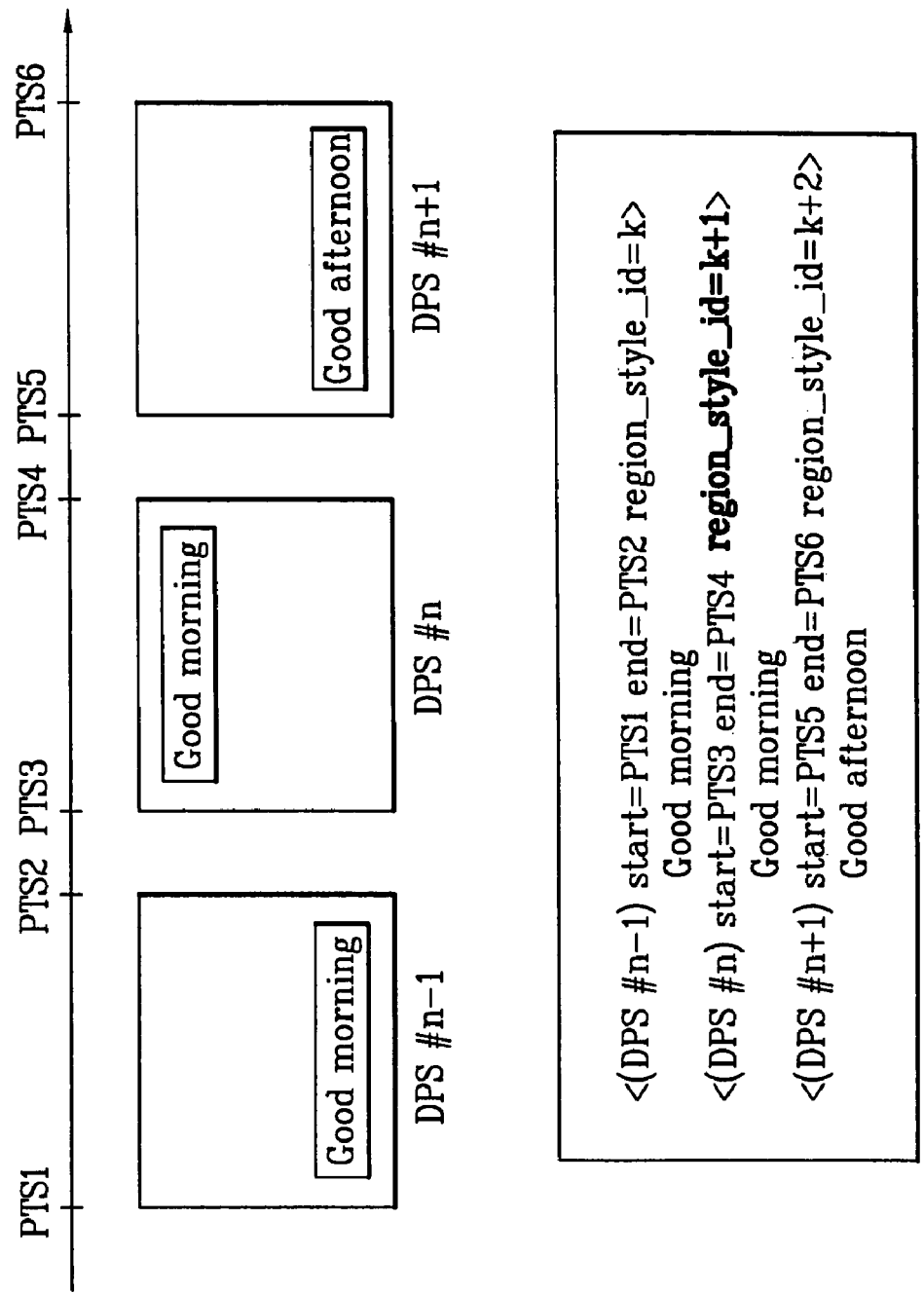

FIG. 9

```
Text_Subtitle_stream () {
    dialog_style_segment()
    while (processed_length < end_of_file){
        dialog_presentation_segment ()
    }
}
```

FIG. 10A

```
dialog_style_segment () {
    segment_type
    reserved
    segment_length
    dialog_styleset()
}
```

FIG. 10B

```
dialog_styleset () {
    player_style_flag
    reserved
    number_of_region_styles
    number_of_user_styles
    for (region_style_id=0;
    region_style_id<number_of_region_styles; region_style_id++) {
        region_style() {
            region_info() {
                region_horizontal_position
                region_vertical_position
                region_width
                region_height
                region_bg_color_entry_id
            }
            text_horizontal_position
            text_vertical_position
            text_flow
            text_alignment
            line_space
            font_id
            font_style
            font_size
            font_color_entry_id
        }
        user_changeable_styleset()
    }
    palette ()
}
```

FIG. 10C

```
user_changeable_styleset () {
    for(user_style_id=0;
    user_style_id<number_of_user_styles;
    user_style_id++){
                User_control_style() {
                region_horizontal_position_direction
                region_horizontal_position_delta
                region_vertical_position_direction
                region_vertical_position_delta
                text_horizontal_position_direction
                text_horizontal_position_delta
                text_vertical_position_direction
                text_vertical_position_delta
                line_space_inc_dec
                line_space_delta
                reserved
                font_size_inc_dec
                font_size_delta
                }
        }
```

FIG. 10D

```
palette() {
    length
    while (processed_length < length) {
        palette_entry() {
            palette_entry_id
            Y_value
            Cr_value
            Cb_value
            T_value
```

FIG. 11A

```
dialog_presentation_segment () {
    segment_type
    reserved
    segment_length
    dialog_start_PTS
    dialog_end_PTS
    palette_update_flag
    reserved
    if (palette_update_flag==1b) {
        palette()
    }
    number_of_regions
    for (region_id=0; region_id<number_of_regions; region_id++) {
        dialog_region() {
            continuous_present_flag[region_id]
            region_style_id[region_id]
            region_subtitle()
            ~~
        }
        ~~
    }
    ~~
}
```

FIG. 11B

```
region_subtitle () {
        region_subtitle_length
        while (processed_length < region_subtitle_length) {
                escape_code
                data_type
                reserved
                if (data_type == 0b) {
                                inline_style_length
                                inline_style() {
                                                for (i=0; i<inline_style_length; i++) {
                                                                inline_style_type
                                                                inline_style_data_byte
                                                }
                                }
                }
                else {
                                text_string_length
                                text_string() {
                                                for (i=0; i<text_string_length; i++) {
                                                                char_data_byte
                                                }
                                }
                }
        }
}
```

FIG. 11C (data_type = 0b)

| inline_style_type | Meanings | data_length |
|---|---|---|
| 0x00 | reserved | |
| 0x01 | Change a Font set | 1 |
| 0x02 | Change a font style | 1 |
| 0x03 | Change a font size | 1 |
| 0x04 | Change a font color | 1 |
| other values | reserved | |
| 0x0A | Line break | 0 |

RECORDING MEDIUM, METHOD, AND APPARATUS FOR REPRODUCING TEXT SUBTITLE STREAMS

This application claims the benefit of the Korean Patent Application No. 10-2004-0020890, filed on Mar. 26, 2004, and No. 10-2004-0022251, filed on Mar. 31, 2004, which is hereby incorporated by reference as if fully set forth herein.

BACKGROUND OF THE INVENTION

1. Field of the Invention

The present invention relates to a recording medium, and more particularly, to a recording medium, method, and apparatus for reproducing text subtitle streams. Although the present invention is suitable for a wide scope of applications, it is particularly suitable for recording the text subtitle stream file within the recording medium and effectively reproducing the recorded text subtitle stream.

2. Discussion of the Related Art

Optical discs are widely used as an optical recording medium for recording mass data. Presently, among a wide range of optical discs, a new high-density optical recording medium (hereinafter referred to as "HD-DVD"), such as a Blu-ray Disc (hereafter referred to as "BD"), is under development for writing and storing high definition video and audio data. Currently, global standard technical specifications of the Blu-ray Disc (BD), which is known to be the next generation technology, are under establishment as a next generation optical recording solution that is able to have a data significantly surpassing the conventional DVD, along with many other digital apparatuses.

Accordingly, optical reproducing apparatuses having the Blu-ray Disc (BD) standards applied thereto are also being developed. However, since the Blu-ray Disc (BD) standards are yet to be completed, there have been many difficulties in developing a complete optical reproducing apparatus. Particularly, in order to effectively reproduce the data from the Blu-ray Disc (BD), not only should the main AV data as well as various data required for a user's convenience, such as subtitle information as the supplementary data related to the main AV data, be provided, but also managing information for reproducing the main data and the subtitle data recorded in the optical disc should be systemized and provided.

However, in the present Blu-ray Disc (BD) standards, since the standards of the supplementary data, particularly the subtitle stream file, are not completely consolidated, there are many restrictions in the full-scale development of a Blu-ray Disc (BD) basis optical reproducing apparatus. And, such restrictions cause problems in providing the supplementary data such as subtitles to the user.

SUMMARY OF THE INVENTION

Accordingly, the present invention is directed to a recording medium, method, and apparatus for reproducing text subtitle streams that substantially obviate one or more problems due to limitations and disadvantages of the related art.

An object of the present invention is to provide a method and apparatus for reproducing a text subtitle stream that can record and reproduce a text subtitle stream file within a recording medium, such as a blu-ray disc (BD).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium for reproducing text subtitle streams includes a data area storing at least one text subtitle stream, each text subtitle stream including a dialog style segment defining a group of region styles and a plurality of dialog presentation segments, each dialog presentation segment containing at least one region of dialog text each of which is linked to a selected one of the group of region styles, wherein a first region of dialog text included in a current dialog presentation segment contains a continuous presentation flag which indicates that continuous presentation is required between the first region of dialog text and a second region of dialog text included in a previous dialog presentation segment.

In another aspect of the present invention, a recording medium for reproducing text subtitle streams includes a data area storing at least one text subtitle stream, each text subtitle stream including a dialog style segment defining a group of region styles and a plurality of dialog presentation segments, at least one of the plurality of dialog presentation segments containing first and second regions of dialog text which are linked to first and second region styles selected from the group of region styles, respectively, wherein the first and second region styles define a same text flow.

In another aspect of the present invention, a method for reproducing text subtitle streams includes reading a dialog style segment included in a text subtitle stream recorded on a recording medium, the dialog style segment defining a group of region styles, the text subtitle stream further including first and second dialog presentation segments, presenting a first region of dialog text included in the first dialog presentation segment in a graphics plane, the first region of dialog text being linked to one of the group of region styles, reading a continuous presentation flag included in the second dialog presentation segment, the second dialog presentation segment including a second region of dialog text which is linked to one of the group of region styles, and presenting the second region of dialog text by preserving the presentation of the first region of dialog text in the graphics plane, if the continuous presentation segment indicates that continuous presentation is required between the first and second regions of dialog text.

In a further aspect of the present invention, an apparatus for reproducing text subtitle streams includes a buffer configured to preload a text subtitle stream, the preloaded text subtitle stream including a dialog style segment defining a group of region styles and first and second dialog presentation segments, and a text subtitle decoder configured to present a first region of dialog text included in the first dialog presentation segment in a graphics plane, and to read a continuous presentation flag included in the second dialog presentation segment, the second dialog presentation segment including a second region of dialog text, wherein the text subtitle decoder presenting the second region of dialog text by preserving the presentation of the first region of dialog text in the graphics plane, if the continuous presentation segment indicates that continuous presentation is required between the first and second regions of dialog text.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 8A to 8C illustrate examples of discontinuous presentation or continuous presentation of the text subtitle stream according to the present invention;

FIG. 9 illustrates a syntax of the text subtitle stream file according to the present invention;

FIGS. 10A to 10D illustrate a detailed structure of a dialog_style_segment( ), which represents a dialog style segment (DSS) according to the present invention;

FIGS. 11A through 11C a detailed structure of a dialog_presentation_segment( ), which presents a dialog presentation segment (DPS) according to the present invention;

DETAILED DESCRIPTION OF THE INVENTION

Figure 1:
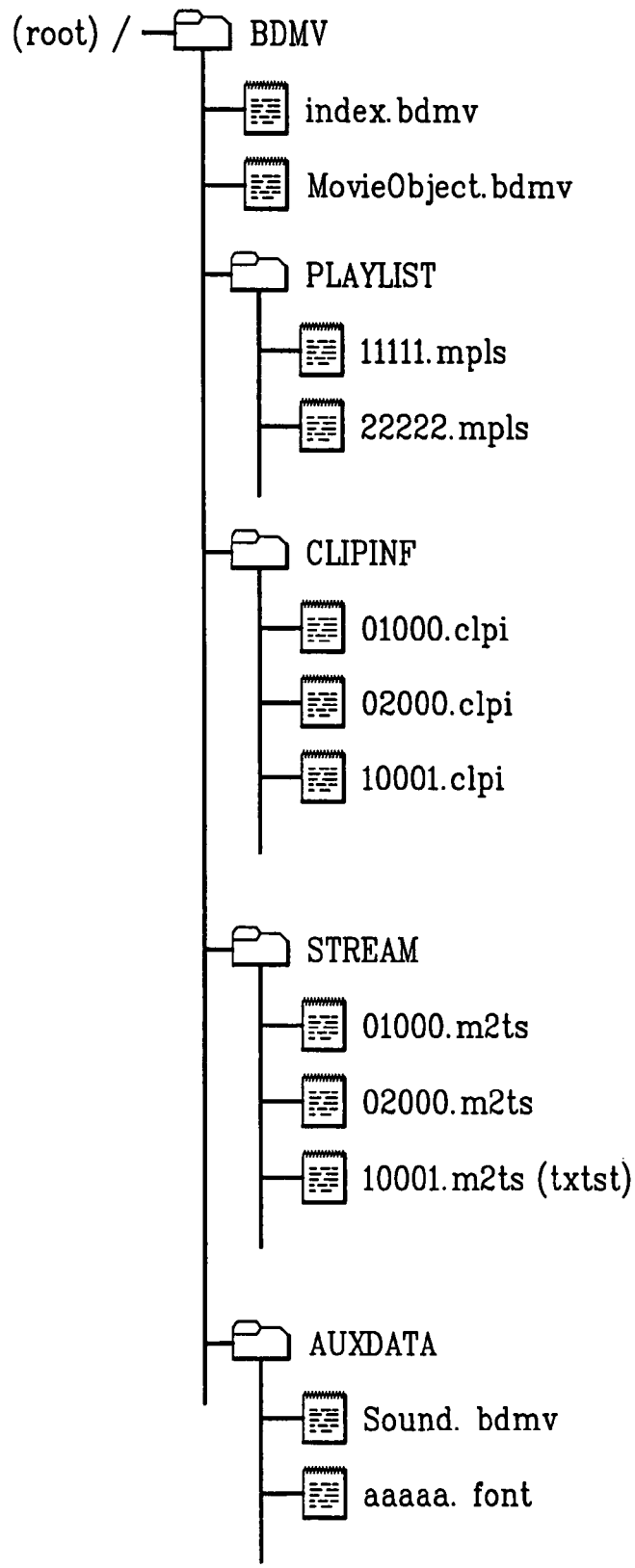
FIG. 1 illustrates a structure of the data files recorded in an optical disc according to the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "Blu-ray disc (BD)" will be given as an example of the recording medium proposed herein. However, it will be apparent that the spirit or scope of the present invention may be equally applied to other types of recording medium.

In this detailed description, "main data" represent audio/video (AV) data that belong to a title (e.g., a movie title) recorded in an optical disc by an author. In general, the AV data are recorded in MPEG2 format and are often called AV streams or main AV streams. In addition, "supplementary data" represent all other data required for reproducing the main data, examples of which are text subtitle streams, interactive graphic streams, presentation graphic streams, and supplementary audio streams (e.g., for a browsable slideshow). These supplementary data streams may be recorded in MPEG2 format or in any other data format. They could be multiplexed with the AV streams or could exist as independent data files within the optical disc.

A "subtitle" represents caption information corresponding to video (image) data being reproduced, and it may be represented in a predetermined language. For example, when a user selects an option for viewing one of a plurality of subtitles represented in various languages while viewing images on a display screen, the caption information corresponding to the selected subtitle is displayed on a predetermined portion of the display screen. If the displayed caption information is text data (e.g., characters), the selected subtitle is often called a "text subtitle". In the present invention, an "MPEG-2 format" refers to an encoding and decoding method in accordance with an international standard established as the ISO/IEC 13818 standard. According to one aspect of the present invention, a plurality of text subtitle streams in MPEG2 format may be recorded in an optical disc, and they may exist as a plurality of independent stream files. Each "text subtitle stream file" is created and recorded within an optical disc. And, the purpose of the present invention is to provide a method and apparatus for reproducing the recorded text subtitle stream file.

FIG. 1 illustrates a file structure of the data files recorded in a Blu-ray disc (hereinafter referred to as "BD") according to the present invention. Referring to FIG. 1, at least one BD directory (BDMV) is included in a root directory (root). Each BD directory includes an index file (index.bdmv) and an object file (MovieObject.bdmv), which are used for interacting with one or more users. For example, the index file may contain data representing an index table having a plurality of selectable menus and movie titles. Each BD directory further includes four file directories that include audio/video (AV) data to be reproduced and various data required for reproduction of the AV data.

The file directories included in each BD directory are a stream directory (STREAM), a clip information directory (CLIPINF), a playlist directory (PLAYLIST), and an auxiliary data directory (AUX DATA). First of all, the stream directory (STREAM) includes audio/video (AV) stream files having a particular data format. For example, the AV stream files may be in the form of MPEG2 transport packets and be named as "*.m2ts", as shown in FIG. 1. The stream directory may further include one or more text subtitle stream files, where each text subtitle stream file includes text (e.g., characters) data for a text subtitle represented in a particular language and reproduction control information of the text data. The text subtitle stream files exist as independent stream files within the stream directory and may be named as "*.m2ts" or "*.txtst", as shown in FIG. 1. An AV stream file or text subtitle stream file included in the stream directory is often called a clip stream file.

Next, the clip information directory (CLIPINF) includes clip information files that correspond to the stream files (AV or text subtitle) included in the stream directory, respectively. Each clip information file contains property and reproduction timing information of a corresponding stream file. For example, a clip information file may include mapping information, in which presentation time stamps (PTS) and source packet numbers (SPN) are in a one-to-one correspondence and are mapped by an entry point map (EPM), depending upon the clip type. Using the mapping information, a particular location of a stream file may be determined from a set of timing information (In-Time and Out-Time) provided by a PlayItem or SubPlayItem, which will be discussed later in more details. In the industry standard, each pair of a stream file and its corresponding clip information file is designated as a clip. For example, 01000.clpi included in CLIPINF includes property and reproduction timing information of 01000.m2ts included in STREAM, and 01000.clpi and 01000.m2ts form a clip.

Referring back to FIG. 1, the playlist directory (PLAYLIST) includes one or more PlayList files (*.mpls), where each PlayList file includes at least one PlayItem that designates at least one main AV clip and the reproduction time of the main AV clip. More specifically, a PlayItem contains information designating In-Time and Out-Time, which represent reproduction begin and end times for a main AV clip designated by Clip_Information_File_Name within the PlayItem. Therefore, a PlayList file represents the basic reproduction file information, which performs reproduction of a combination of clips desired by a combination of one or more PlayItems. In addition, the PlayList file may further include a SubPlayItem, which represents the basic reproduction control information for a text subtitle stream file. When a SubPlayItem is included in a PlayList file to reproduce one or more text subtitle stream files, the SubPlayItem is synchronized with the PlayItem(s). On the other hand, when the SubPlayItem is used to reproduce a browsable slideshow, it may not be synchronized with the PlayItem(s). According to the present invention, the main function of a SubPlayItem is to control reproduction of one or more text subtitle stream files.

Lastly, the auxiliary data directory (AUX DATA) may include supplementary data stream files, examples of which are font files (e.g., aaaaa.font or aaaaa.otf), pop-up menu files (not shown), and sound files (e.g., Sound.bdmv) for generating click sound. The text subtitle stream files mentioned earlier may be included in the auxiliary data directory instead of the stream directory.

Figure 2:
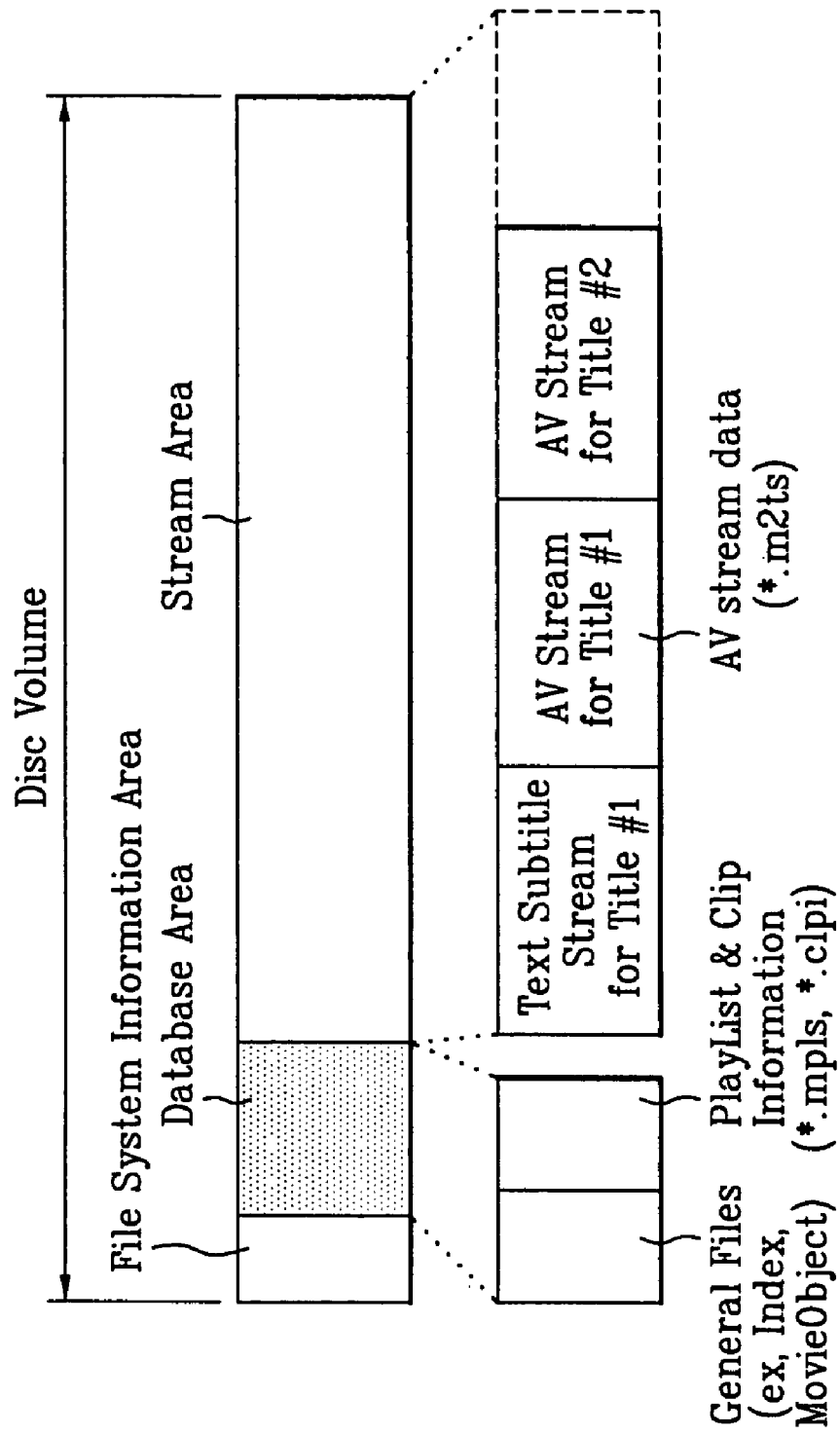
FIG. 2 illustrates data storage areas of the optical disc according to the present invention.

FIG. 2 illustrates data storage areas of an optical disc according to the present invention. Referring to FIG. 2, the optical disc includes a file system information area occupying the inmost portion of the disc volume, a stream area occupying the outmost portion of the disc volume, and a database area occupied between the file system information area and the stream area. In the file system information area, system information for managing the entire data files shown in FIG. 1 is stored. Next, main data and supplementary data (i.e., AV streams and one or more text subtitle streams) are stored in the stream area. The main data may include audio data, video data, and graphic data. And, the supplementary data (i.e., the text subtitle) is independently stored in the stream area without being multiplexed with the main data. The general files, PlayList files, and clip information files shown in FIG. 1 are stored in the database area of the disc volume. As discussed above, the general files include an index file and an object file, and the PlayList files and clip information files include information required to reproduce the AV streams and the text subtitle streams stored in the stream area. Using the information stored in the database area and/or stream area, a user is able to select a specific playback mode and to reproduce the main AV and text subtitle streams in the selected playback mode.

Figure 3:
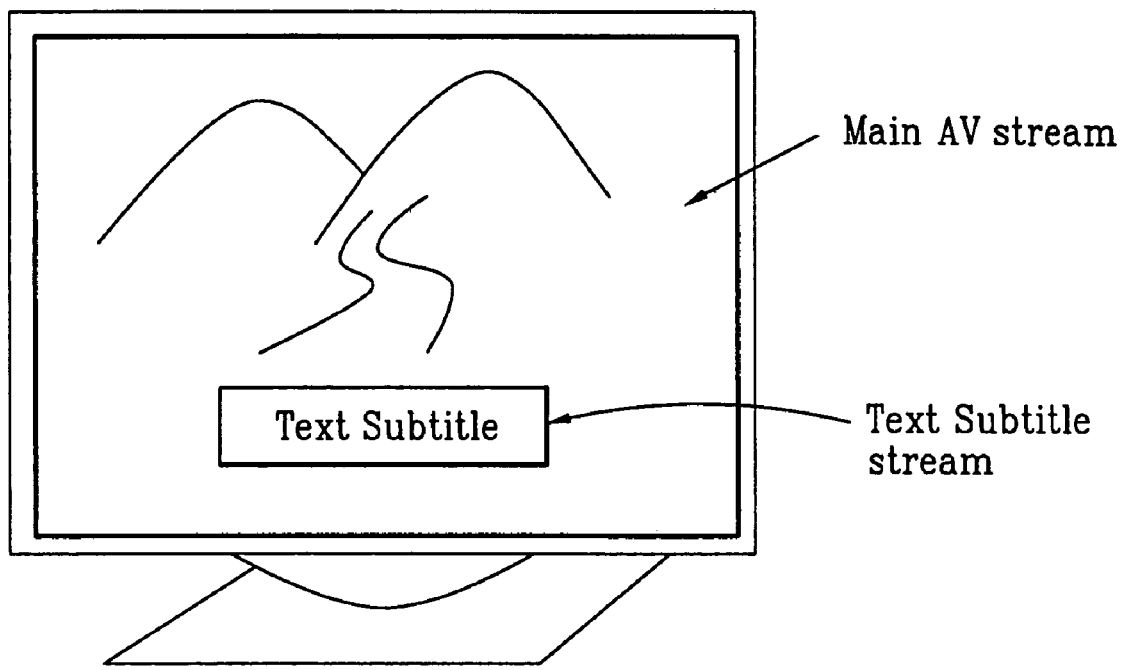
FIG. 3 illustrates a text subtitle and a main image presented on a display screen according to the present invention.

Hereinafter, the structure of the text subtitle stream file according to the present invention will be described in detail. First of all, the control information for reproducing the text subtitle stream will be newly defined. Then, the detailed description of the method of creating the text stream file including the newly defined control information, and the method and apparatus of reproducing the text subtitle stream for reproducing the recorded stream file will follow. FIG. 3 illustrates a text subtitle and a main image presented on a display screen according to the present invention. The main image and the text subtitle are simultaneously displayed on the display screen when a main AV stream and a corresponding text subtitle stream are reproduced in synchronization.

Figure 4:
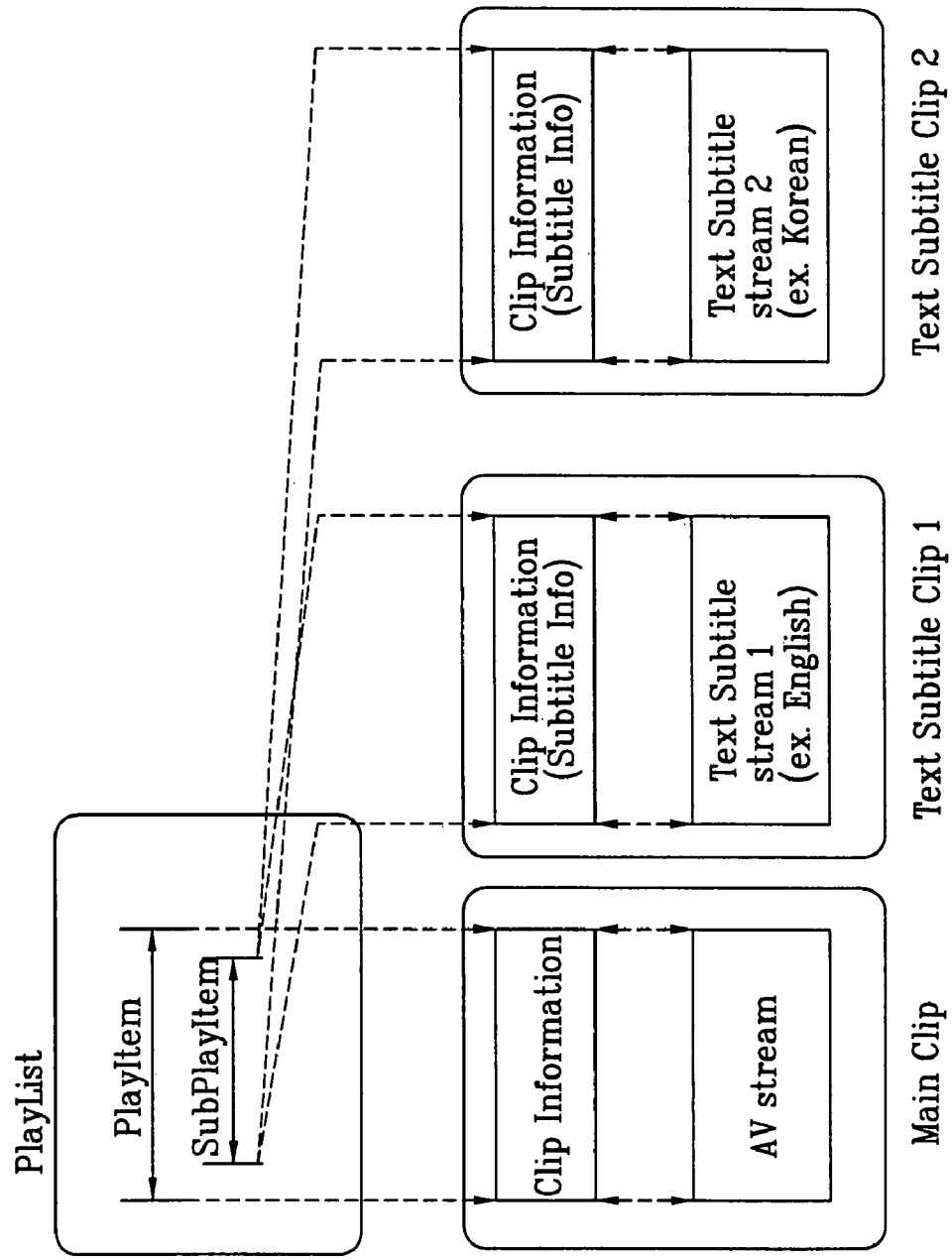
FIG. 4 illustrates a schematic diagram illustrating reproduction control of a text subtitle stream according to the present invention.

FIG. 4 is a schematic diagram illustrating reproduction control of a main AV clip and text subtitle clips according to the present invention. Referring to FIG. 4, a PlayList file includes at least one PlayItem controlling reproduction of at least one main AV clip and a SubPlayItem controlling reproduction of a plurality of text subtitle clips. One of text subtitle clip 1 and text subtitle clip 2, shown in FIG. 4, for English and Korean text subtitles may be synchronized with the main AV clip such that a main image and a corresponding text subtitle are displayed on a display screen simultaneously at a particular presentation time. In order to display the text subtitle on the display screen, display control information (e.g., position and size information) and presentation time information, examples of which are illustrated in FIG. 5A to FIG. 5C, are required.

Figure 5A:
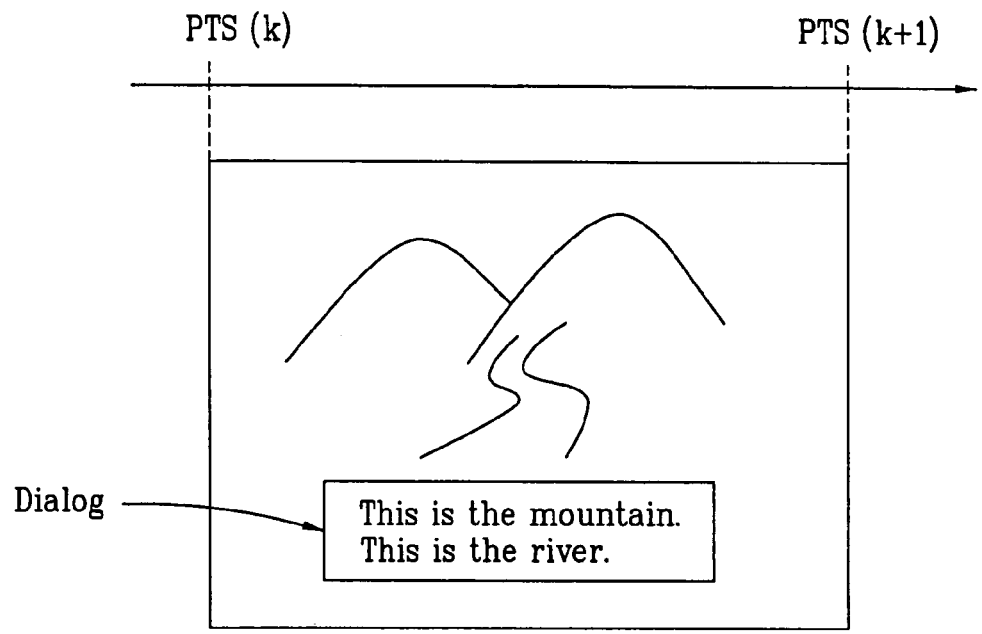
FIGS. 5A to 5C illustrate applications of the reproduction control information for reproducing the text subtitle stream according to the present invention.

FIG. 5A illustrates a dialog presented on a display screen according to the present invention. A dialog represents entire text subtitle data displayed on a display screen during a given presentation time. In general, presentation times of the dialog may be represented in presentation time stamps (PTS). For example, presentation of the dialog shown in FIG. 5A starts at PTS (k) and ends at PTS (k+1). Therefore, the dialog shown in FIG. 5A represents an entire unit of text subtitle data which are displayed on the display screen between PTS (k) and PTS (k+1). A dialog includes a maximum of 100 character codes in one text subtitle.

Figure 5B:
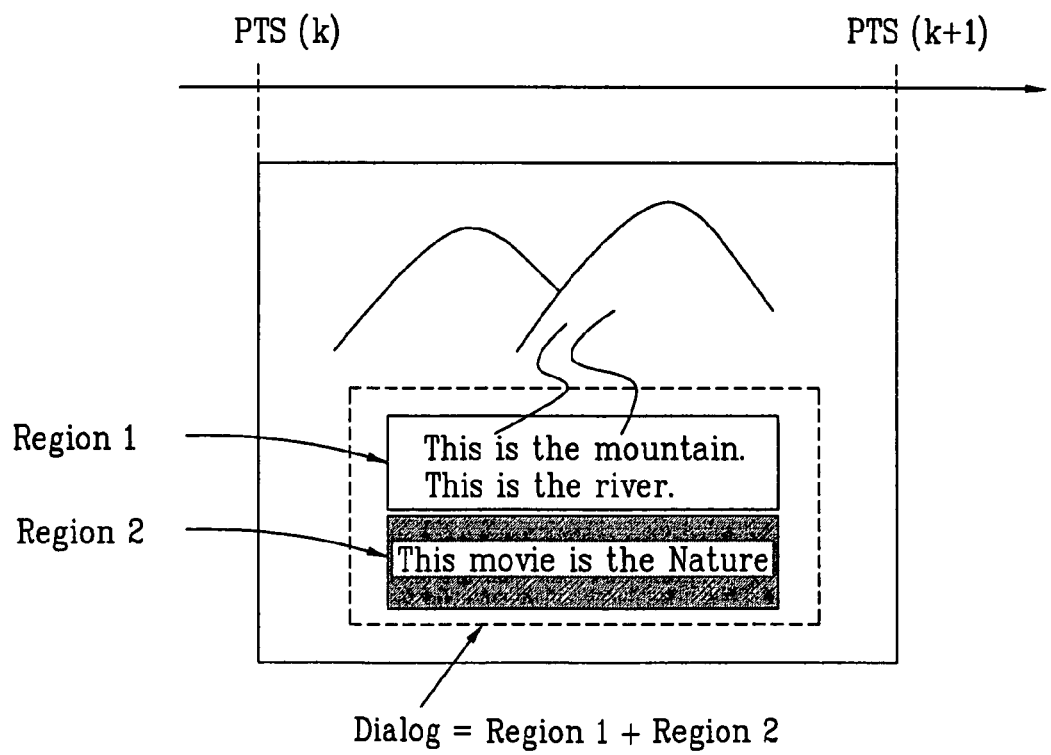

In addition, FIG. 5B illustrates regions of a dialog according to the present invention. A region represents a divided portion of text subtitle data (dialog) displayed on a display screen during a given presentation time. In other words, a dialog includes at least one region, and each region may include at least one line of subtitle text. The entire text subtitle data representing a region may be displayed on the display screen according to a region style (global style) assigned to the region. The maximum number of regions included in a dialog should be determined based on a desired decoding rate of the subtitle data because the greater number of regions generally results in a lower decoding ratio. For example, the maximum number of regions for a dialog may be limited to two in order to achieve a reasonably high decoding rate. Accordingly, the maximum number of regions within a single dialog is limited to 2 because of the decoding load, when the text subtitle stream is reproduced. In another embodiment of the present invention, a maximum of n number (wherein, n>2) of regions may exist within a single dialog.

Figure 5C:
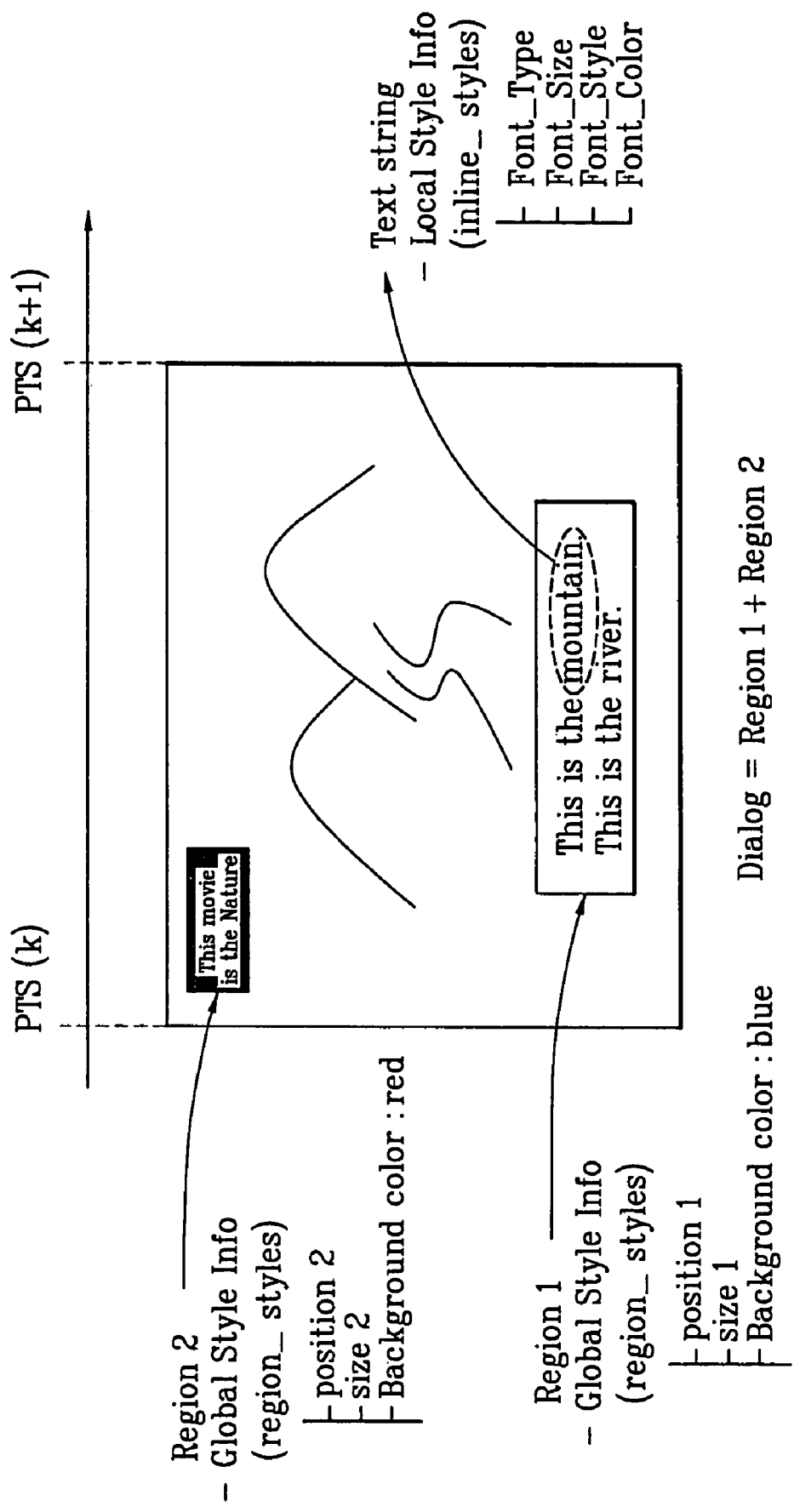

FIG. 5C illustrates style information for regions of a dialog according to the present invention. Style information represents information defining properties required for displaying at least a portion of a region included in a dialog. Some of the examples of the style information are position, region size, background color, text alignment, text flow information, and many others. The style information may be classified into region style information (global style information) and inline style information (local style information).

Region style information defines a region style (global style) which is applied to an entire region of a dialog. For example, the region style information may contain at least one of a region position, region size, font color, background color, text flow, text alignment, line space, font name, font style, and font size of the region. For example, two different region styles are applied to region 1 and region 2, as shown in FIG. 5C. A region style with "position 1, size 1, and color=blue" is applied to Region 1, and a different region style with "position 2, size 2, and color=red" is applied to Region 2.

On the other hand, inline style information defines an inline style information (local style information) which is applied to a particular portion of text data strings included in a region. For example, the inline style information may contain at least one of a font type, font size, font style, and font color. The particular portion of text strings may be an entire text line within a region or a particular portion of the text line. Referring to FIG. 5C, a particular inline style is applied to the text portion "mountain" included in Region 1. In other words, at least one of the font type, font size, font style, and font color of the particular portion of text strings is different from the remaining portion of the text strings within Region 1. Accordingly, the above-described text data is recorded and described as a "text string" that is applied to a specific inline style information (inline_styles).

Figure 6:
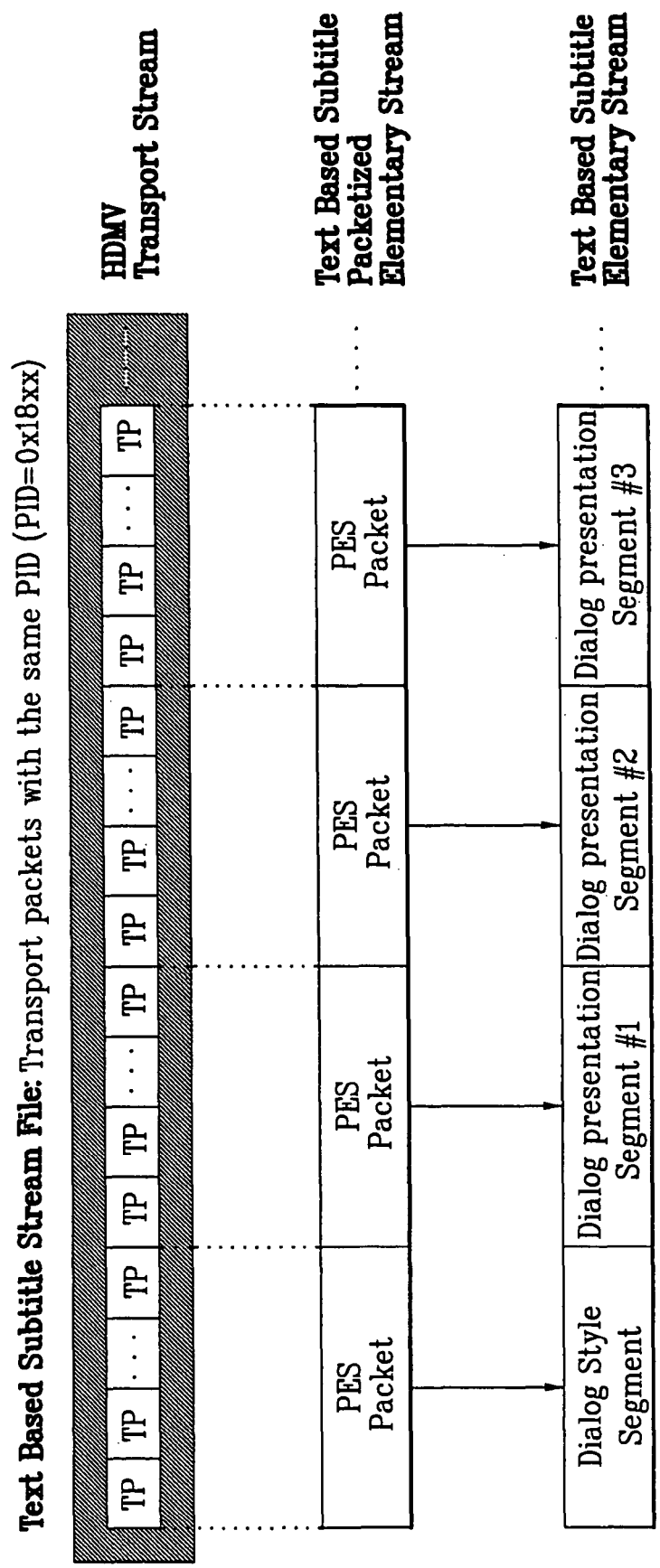
FIG. 6 illustrates the structure of a text subtitle stream file according to the present invention.

FIG. 6 illustrates a text subtitle stream file (e.g., 10001.m2ts shown in FIG. 1) according to the present invention. The text subtitle stream file may be formed of an MPEG2 transport stream including a plurality of transport packets (TP), all of which have a same packet identifier (e.g., PID=0x18xx). When a disc player receives many input streams including a particular text subtitle stream, it finds all the transport packets that belong to the text subtitle stream using their PIDs. Referring to FIG. 6, each sub-set of transport packets form a packet elementary stream (PES) packet. One of the PES packets shown in FIG. 6 corresponds to a dialog style segment (DSS) defining a group of region styles. All the remaining PES packets after the second PES packet correspond to dialog presentation segments (DPSs)

In the above-described text subtitle stream structure of FIG. 6, each of the dialog information shown in FIGS. 5A to 5C represent a dialog presentation segment (DPS). And, the style information included in the dialog information represents a set of information that links any one of the plurality of region style sets defined in the dialog style segment (DSS), which can also be referred to as "region_style_id", and inline styles. A standardized limited number of region style sets is recorded in the dialog style segment (DSS). For example, a maximum of 60 sets of specific style information is recorded, each of which is described by a region_style_id. Therefore, is a text subtitle decoder (shown in FIG. 12B), the dialog presentation segment (DPS) is read and decoded only one at a time.

Figure 7:
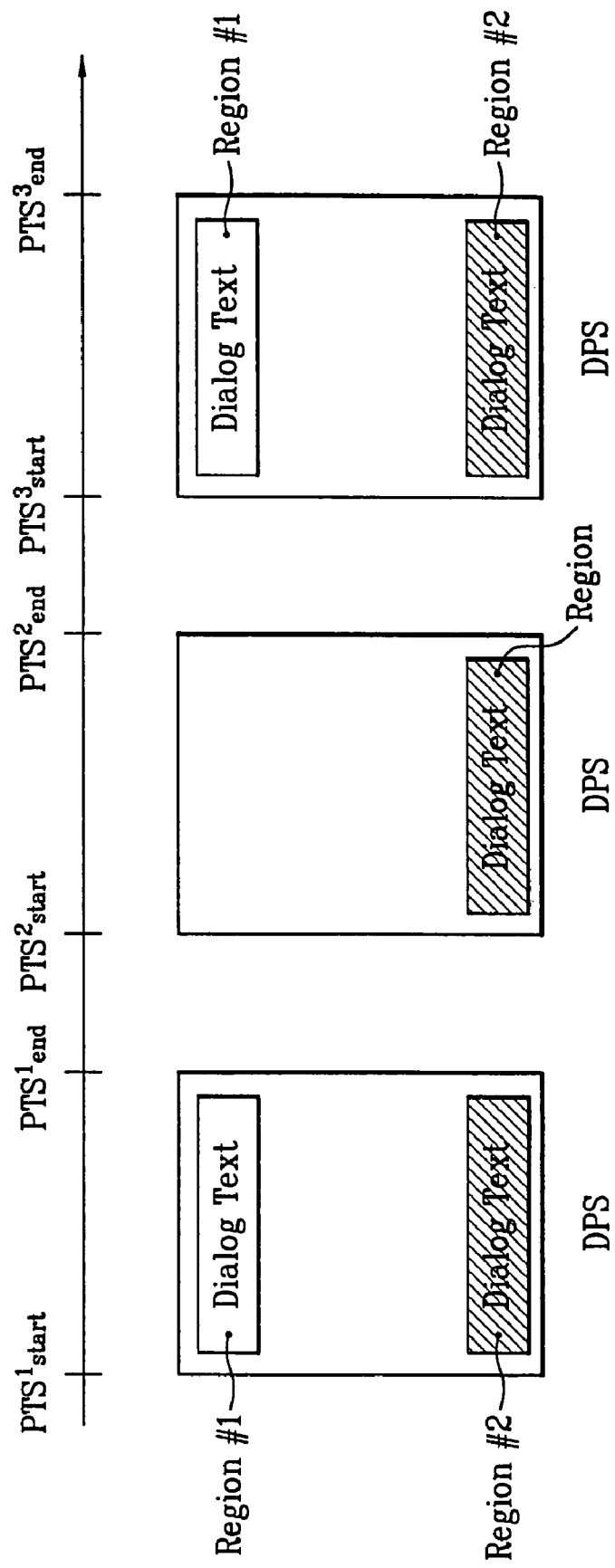
FIG. 7 an example of the method for writing the reproduction control information within the text subtitle stream according to the present invention.

FIG. 7 illustrates a method for creating a text subtitle stream according to the present invention, wherein each dialog presentation segment (DPS) being applied to each presentation time (PTS) section is defined. More specifically, referring to FIG. 7, DPS #n−1 is formed of two (2) regions (Region #1 and Region #2), wherein a specific Dialog text is recorded in each region. The DPS #n−1 is presented onto the screen within the PTS1_start~PTS1_end section. And, DPS #n is formed of one (1) region, wherein a specific Dialog text is recorded in the corresponding region. The DPS #n is presented onto the screen within the PTS2_start~PTS2_end section. Finally, DPS #n+1 is formed of two (2) regions (Region #1 and Region #2), wherein a specific Dialog text is recorded in each region. The DPS #n+1 is presented onto the screen within the PTS3_start~PTS3_end section.

Figure 8B:
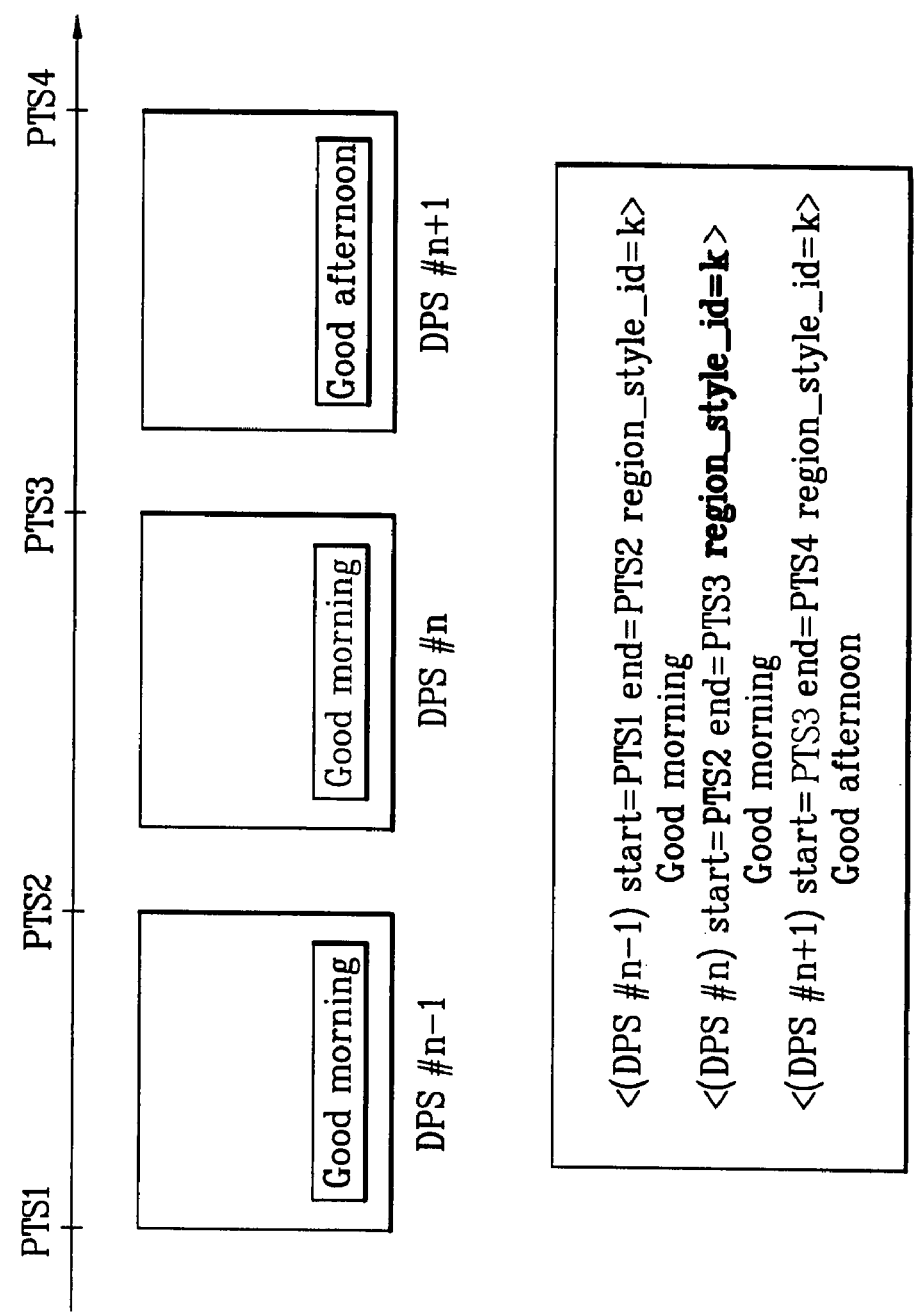

Accordingly, the characteristics of the DPS formed within one picture, as described above, will now be described in detail with reference to FIGS. 8A to 8C. Firstly, either continuous presentation or discontinuous presentation may be performed between neighboring DPSs. FIG. 8A illustrates the discontinuous presentation between the DPSs (i.e., the discontinuous DPS), and FIG. 8B illustrates the continuous presentation between the DPSs (i.e., the continuous DPS).

Referring to FIG. 8A, three (3) neighboring DPSs, i.e., DPS #n−1, DPS #n, and DPS #n+1, are all discontinuous. For example, the end PTS (=PTS2) of DPS #n−1 is different from the start PTS (=PTS3>PTS2) of DPS #n. Similarly, the end PTS (=PTS4) of DPS #n is different from the start PTS (=PTS5>PTS4) of DPS #n+1. Therefore, each of the DPSs shown in FIG. 8A is formed as DPSs that are independent from one another. Each independent (or discontinuous) DPS includes a specific region style information (region_style_id), and the position, background color, font size, font color, and so on, of the dialog text within the DPS is decided in accordance with the corresponding region style information. More specifically, "region_style_id=k" may be designated to DPS #n−1, "region_style_id=k+1" may be designated to DPS #n, and "region_style_id=k+2" may be designated to DPS #n+1. However, even though each DPS is independent from one another, an identical region style information (region_style_id) may also be equally applied to each DPS.

Referring to FIG. 8B, three (3) neighboring DPSs, i.e., DPS #n−1, DPS #n, and DPS #n+1, are all continuous. For example, the end PTS (=PTS2) of DPS #n−1 is identical to the start PTS (=PTS2) of DPS #n. Similarly, the end PTS (=PTS3) of DPS #n is identical to the start PTS (=PTS3) of DPS #n+1. Therefore, each of the DPSs shown in FIG. 8B is formed as DPSs that are associated with one another. Each continuous DPS (DPS #n−1, DPS #n, and DPS #n+1) includes an identical specific region style information (e.g., region_style_id=k). And, thus, the position, background color, font size, font color, and so on, of the dialog text within each of DPS #n−1, DPS #n, and DPS #n+1 is equally decided in accordance with the corresponding region style information.

Figure 8C:
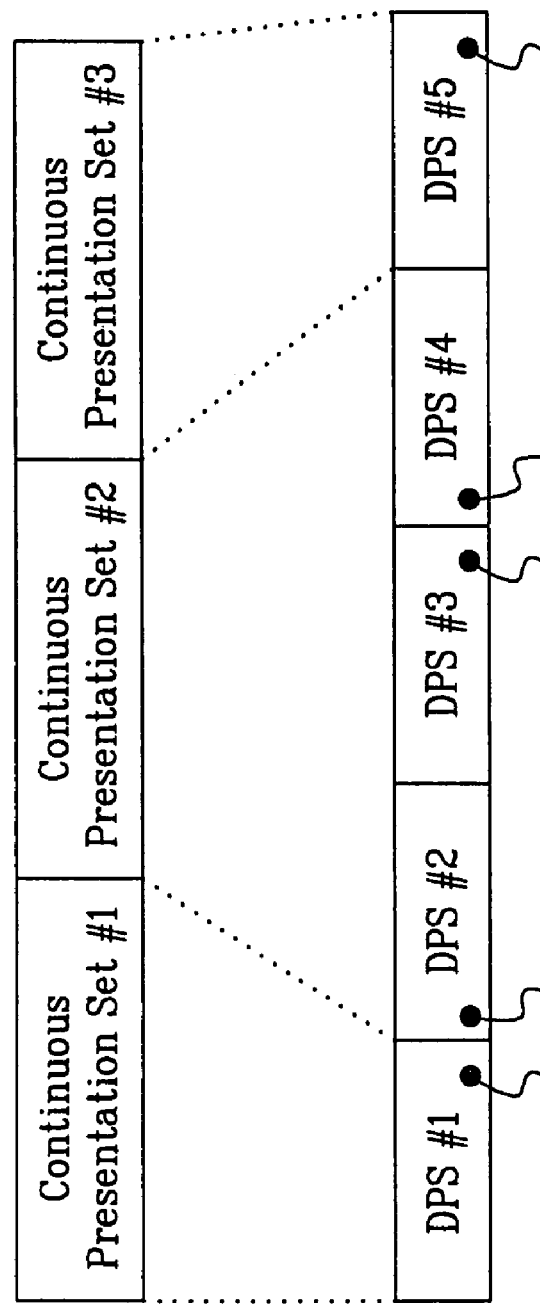

FIG. 8C illustrates a method for presenting (or reproducing) the discontinuous DPS and the continuous DPS. More specifically, the text subtitle stream file includes a continuous_present_flag, which indicate whether continuous presentation is performed between each region of neighboring dialog presentation segments (DPSs), as shown in FIG. 8A. Therefore, if the reproduction (or presentation) of the current DPS is continued from the previous DPS, "continuous_present_flag=1" is assigned, and if reproduction is not continued, "continuous_present_flag=0" is assigned. At this point, if at least one of the regions included in the DPS is set to be continuously reproduced, the corresponding DPS is defined as a "continuous presentation DPS". Thus, for example, DPS #2, DPS #3, and DPS #4, which are continuous presentation DPSs, are grouped as "continuous presentation set #2". And, when the above-described continuous presentation set #2 is reproduced (or presented), the first DPS of the continuous presentation set #2 (i.e., DPS #2) is first reproduced. Thereafter, without clearing the text data displayed onto the screen, the presentation is continued until the end of the presentation, which is until the end of the display of DPS #4. Conversely, since DPS #1 and DPS #5 are discontinuous DPSs, DPS #1 and DPS #5 are presented (or reproduced) independently regardless of their neighboring DPSs.

Furthermore, regardless of whether the DPS is a continuous DPS or a discontinuous DPS, the Dialog text in each DPS should be newly defined. And, even two (2) regions exist in the same DPS, the Dialog text flow within each region should be defined to be in the same direction. More specifically, each DPS should include a Dialog text information signifying (or referring to) the corresponding DPS, and this rule equally applies to the continuous DPS. In addition, when two (2) regions are included in one DPS, each region should have the same text flow. In other words, a case in which the first region has a text flow direction of left-to-right (left→right) and the second region has a text flow direction of top-to-bottom (top→bottom) cannot be accepted or allowed, since the two text flow directions are different from one another. Such condition should be apprehended as a forced condition in order to prevent users from viewing disturbed images.

The syntax structure of the above-described dialog style segment (DSS) and the dialog presentation segment (DPS) will now be described in detail with reference to FIGS. 9 to 11C. FIG. 9 illustrates a syntax of the text subtitle stream (Text_subtitle_stream( )) according to the present invention. As described in FIG. 6, the Text_subtitle_stream( ) includes a dialog_style_segment( ) syntax and a dialog_presentation_segment( ) syntax. More specifically, the dialog_style_segment( ) syntax corresponds to a single dialog style segment (DSS) defining the style information set, and the dialog_presentation_segment( ) syntax corresponds to a plurality of dialog presentation segments (DPS) having the actual dialog information recorded therein.

FIGS. 10A to 10C illustrate a detailed structure of the dialog_style_segment( ), which represent the dialog style segment (DSS). More specifically, FIG. 10A illustrates the overall structure of the dialog_style_segment( ), wherein a dialog_style set( ) defining diverse style information sets that are applied in the dialog is defined. FIG. 10B illustrates a dialog_style set( ) according to the present invention, which is defined in the dialog_style_segment( ). Apart from the region_styles, the dialog_style_set( ) includes a Player_style_ flag, a user_changeable_style set( ), and a palette( ). The Player_style_flag indicates whether change in style information by the player is authorized. Also, the user_changeable_style set( ) defines the range of change in style information by the player, and the palette( ) indicates color information and degree of transparency.

The region style information (region_styles) represents Global style information defined for each region, as described above. A region_style_id is assigned to each region, and a style information set corresponding to the specific region_style_id is defined. Therefore, when reproducing a dialog by recording the region_style_id, which is applied to the corresponding dialog, within the dialog presentation segment (DPS), style information set values defined by identical region_style_id within the dialog_style_set( ) are applied, so as to reproduce the dialog. Accordingly, individual style information included in the style information set provided to each region_style_id will now be described.

Herein, region_horizontal_position, region_vertical_position, region_width, and region_height are provided as information for defining the position and size of a corresponding region within the screen. And, region_bg_color_index information deciding a background color of the corresponding region is also provided. In addition, as information defining an original (or starting) position of the text within the corresponding region, a text_horizontal_position and a text_vertical_position are provided. Also, a text_flow defining the direction of the text (e.g., left→right, right→left, up→down), and a text_alignment defining the alignment direction of the text (e.g., left, center, right) are provided. More specifically, when a plurality of regions are included in a specific dialog, the text_flow of each region included in the corresponding dialog is defined to have the same text_flow value, so as to prevent users from viewing disturbed images.

Furthermore, a line_space designating space between each line within the region is provided as individual style information included in the style information set. And, a font_type, a font-size, and a font_color_index are provided as font information for actual font information. Meanwhile, the Player_style_flag recorded within the dialog_style set( ) indicates whether an author may apply the style information provided to the player. For example, when Player_style_flag=1b, as well as the style information defined in the dialog_style set( ) recorded in a disc, the player is authorized to reproduce the text subtitle stream by applying the style information provided within the player itself. On the other hand, when Player_style_flag=0b, only usage of the style information defined in the dialog_style set( ) recorded within the disc is authorized.

FIG. 10C illustrates the user_changeable_style set( ) according to the present invention, which is defined in dialog_style set( ). The user_changeable_style set( ) pre-defines the types of style information that can be changed by the user and the range of change, and the user_changeable_style set( ) is used for easily changing the style information of the text subtitle data. However, when the user is enabled to change all style information, which are described in FIG. 10B, the user may more confused. Therefore, in the present invention, the style information of only the font_size, the region_horizontal_position, and the region_vertical_position may be changed. And, accordingly, variation in the text position and the line space, which may be changed in accordance with the font_size, is also defined in the user_changeable_style set( ). More specifically, the user_changeable_style set( ) is defined for each region_style_id. For example, a maximum of 25 user_style_id within a specific region_style_id=k may be defined in the user_changeable_style set( ).

Also, each user_style_id includes region_horizontal_position_direction and region_vertical_position_direction information, which designate the direction of the changed position of each of the changeable region_horizontal_position and region_vertical_position. Each user_style_id also includes region_horizontal_position_delta and region_vertical_position_delta information for designating a single position movement unit in each direction as a pixel unit. More specifically, for example, when region_horizontal_position_direction=0, the position of the region is moved to a right direction. And, when region_horizontal_position_direction=1, the position of the region is moved to a left direction. Also, when region_vertical_position_direction=0, the position of the region is moved to a downward direction. Finally, when region_vertical_position_direction=1, the position of the region is moved to an upward direction.

Furthermore, each user_style_id includes font_size_inc_dec information, which designates the changing direction each of the changeable font_size, and font_size_delta information for designating a single position movement unit in each direction as a pixel unit. More specifically, for example, font_size_inc_dec=0 represents an increasing direction of the font_size, and font_size_inc_dec=1 represents a decreasing direction of the font_size. Similarly, the changed information (data field) related to the "text position" and the "line space" may also be defined in accordance with the same principle.

The characteristics of the user_changeable_style set( ) according to the present invention now be described in detail. The number of user_control_style( ) defined in each region_style( ) included in the dialog style segment (DSS) is identical. In other words, the number of user_control_styles that can be applied to each dialog presentation segment (DPS) is identical. In addition, each user_control_style( ) is represented by a different user_style_id. And, when the user selects a random user_style_id, the same order of user_control_style( ) is equally applied to each region_style( ). Furthermore, all possible combinations of the changeable styles are defined in a single user_control_style( ). In other words, the region_position and the font_size are simultaneously defined in combination, instead of being defined separately. And, finally, the moving direction (*_direction) or the increase/decrease indication (*_inc_dec) is independently distinguished from each position movement unit (*_delta) and recorded accordingly. More specifically, only the position movement unit (*_delta) is defined without having the style value, which is the value that is actually being changed. Subsequently, the defined position movement unit (*_delta) is added to the value defined in the region_style( ), thereby obtaining the final value of the style value that is actually being changed.

FIG. 10D illustrates palette information (palette( )) according to the present invention, which is defined in the dialog_style set( ). The palette( ) provides color changing information of the text subtitle data recorded within the dialog. Herein, the palette( ) includes a plurality of palette_entries, wherein each palette_entry is described by a palette_entry_id. And, each palette_entry is provided with a specific brightness value (Y_value), a specific color value (Cr_value, Cb_value), and a specific T_value, which designates the transparency of the text data, for each palette_entry_id. Accordingly, one of the characteristics of the text subtitle stream according to the present invention is that only one basic (or common) palette is defined, the palette being applied to each dialog presentation segment (DPS) included in the text subtitle stream file. More specifically, after defining a palette in the dialog style segment (DSS), the defined palette is commonly used in each dialog presentation segment (DPS). However, if a new specific palette is to be used instead of the common palette in a specific dialog presentation segment (DPS), the specific palette is newly defined by using the palette_update_flag, the description of which will follow with reference to FIG. 11A.

FIGS. 11A and 11B illustrate a detailed structure of the dialog_presentation_segment( ), which represent the dialog presentation segment (DPS) according to the present invention. FIG. 11A illustrates the overall structure of the dialog_presentation_segment( ), wherein a dialog_start_PTS and a dialog_end_PTS are defined. The dialog_start_PTS and the dialog_end_PTS designate the presentation time of the corresponding dialog. Then, the dialog_presentation_segment( ) includes a palette_update_flag, which indicates a change of color information within the corresponding dialog. Herein, when palette_update_flag=1b, the color and degree of transparency (T_value) are changed (or updated), and so the palette( ) information, which newly defines the color, is separately recorded. In this case, the palette( ) that is newly defined in the dialog presentation segment (DPS) must only be applied to the corresponding dialog presentation segment (DPS). Assuming that palette_update_flag=0b, when presenting (or reproducing) the corresponding dialog presentation segment (DPS), the above-described common palette, which has been defined in the dialog style segment (DSS), as shown in FIG. 10A, should be restored (or preserved).

Subsequently, a dialog_region( ) that defines the region information is recorded in the dialog_presentation_segment( ). In the present invention, a maximum of two regions is provided within a single dialog, and therefore, dialog_region( ) information is provided to each region. The dialog_region( ) includes region_style_id information and continuous_present_flag information. The region_style_id information designates any one of the region styles, as shown in FIG. 10B, and the continuous_present_flag information identifies whether to perform a seamless reproduction with the previous dialog region, as shown in FIG. 8C. More specifically, the continuous_present_flag is included in each region. If two (2) regions are included in one DPS, and when at least one region is set to be continuous_present_flag =1b, the corresponding DPS becomes the above-described continuous presentation DPS. Further, text data and region_subtitle( ) information are also included in the dialog_region( ). The text data is included in the actual corresponding region, and the region_subtitle( ) information defines the local style information.

FIGS. 11B and 11C illustrate an example of recording the region_subtitle( ), which includes a text string and an identification information (i.e., data_type) identifying the inline style information (i.e., inline_styles) applied to the text string. Also, a 1-byte information (i.e., escape_code) is recorded between the information being identified by the identification information (i.e., data_type). More specifically, the text string and inline_styles are recorded within the region_subtitle( ), so as to include the text string and the identification information (i.e., data_type) identifying the inline style information. Herein, when data_type=0b, the data type is the inline style information (i.e., inline_styles), and when data_type=1b, the data type is the text string. Therefore, when data_type=1b, the text string is recorded as a character code within a specific field (i.e., char_data_byte) included in the text_string( ). In other words, the char_data_byte is used to record text data, such as "Good morning" or "Good afternoon", shown in FIGS. 8A and 8B. And, the text data is recorded in each region within each DPS, regardless of whether the DPS is a continuous presentation DPS or not.

Moreover, when data_type=0b, the inline style information (i.e., inline_styles) is recorded, wherein the inline style information is configured to have at least one inline style type (i.e., inline_style_type). For example, inline_style_type=0x01 represents a change in the Font set, and so a font ID value designated by the corresponding ClipInfo is recorded in a specific field (i.e., the inline_style_data_byte), and inline_style_type=0x02 represents a change in the Font style, and so a corresponding font style value is recorded in a specific field (i.e., the inline_style_data_byte). Also, inline_style_type=0x03 represents a change in the Font size, and a corresponding font size value is recorded in a specific field (i.e., the inline_style_data _byte), and inline_style_type=0x04 represents a change in the Font color, and therefore, an index value designated by the corresponding palette is recorded in a specific field (i.e., the inline_style_data_byte). Further, inline_style_type=0x0A represents a line break. In this case, data is not additionally recorded, except for that when the corresponding type (i.e., inline_style_type=0x0A) is read, one line should be changed upon decoding the text subtitle stream prior to the reproduction (or presentation).

In addition, when data-type=0b, the inline style information (inline_styles) is recorded, wherein information indicating the entire size of the inline_styles is recorded, which is the inline_style_length. And, at least one inline_style_type and an inline_style_data byte value, which records the changed value for each type, are recorded within the corresponding size. Therefore, the at least one inline_style_type included in the inline style information (inline_styles) is continuously recorded as a single unit. Thereafter, when the recording of the corresponding inline style information is completed, a 1-byte information (escape_code) is inserted and recorded between the text string that is recorded by the succeeding (or subsequent) identification information (i.e., data_type).

Figure 12A:
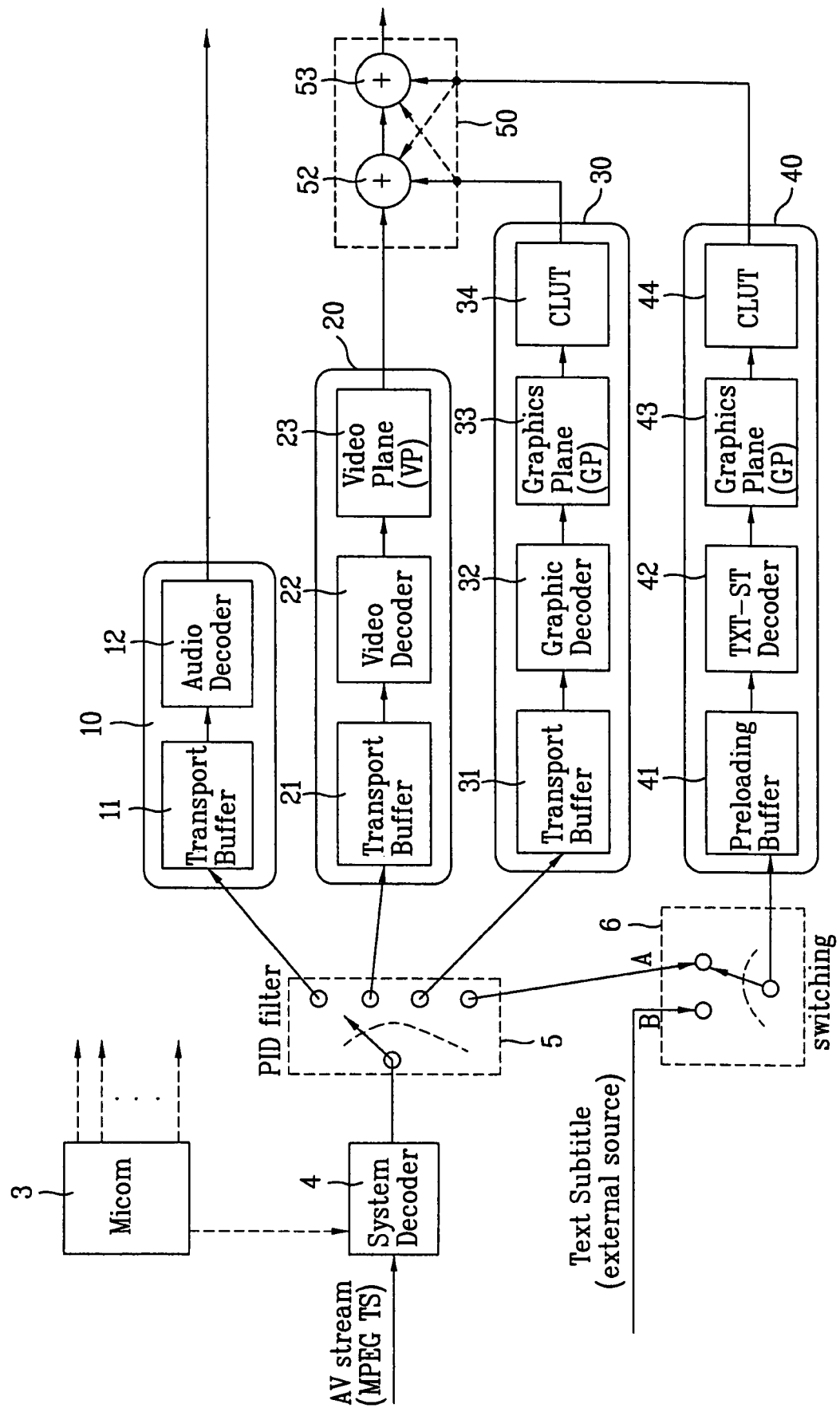
FIGS. 12A and 12B illustrate an optical recording and/or reproducing apparatus including a reproduction of the text subtitle stream file according to the present invention.

Hereinafter, the method and apparatus for reproducing the text subtitle stream recorded on the optical disc, as described above, will now be described in detail with reference to FIGS. 12A and 12B. FIG. 12A illustrates the apparatus for reproducing the optical disc focusing on the decoder according to the present invention and, more particularly, illustrates an example of a text subtitle decoding part 40, which is separately included. More specifically, the apparatus includes a packet identifier (PID) filter 5 for separating input streams into video streams, audio streams, graphic streams, and text subtitle streams based on their packet identifiers, a video decoding part 20 for reproducing the video streams, an audio decoding part 10 for reproducing the audio streams, a graphic decoding part 30 for reproducing the graphic streams, and a text subtitle decoding part 40 for reproducing the text subtitle streams.

The text subtitle streams may be extracted from an optical disc, or they could be inputted from an additional external source, as shown in FIG. 12A. For this reason, the apparatus includes a switch 6 which selects an input data source. Therefore, if the text subtitle streams in MPEG format are extracted from the optical disc, the switch 6 selects data line A connected to the PID filter 5. On the other hand, if they are inputted through an additional external source, the switch 6 selects data line B which is connected to the external source.

The video decoding part 20, audio decoding part 10, graphic decoding part 30 include a transport buffer 21, 11, and 31, respectively, for storing a predetermined size of data streams to be decoded. A video plane 23 and a graphic plane 33 are included in the video decoding part 20 and graphic decoding part 30, respectively, for converting decoded signals into displayable images. The graphic decoding part 30 includes a color look-up table (CLUT) 34 for controlling color and transparency levels of the displayable images.

When the text subtitle decoding part 40 receives one or more text subtitle streams from the switch 6, all of these streams are initially preloaded into a subtitle preloading buffer (SPB) 41 at once. Assuming a typical size of a text subtitle stream file for a single language is about 0.5 megabytes, the size of the subtitle preloading buffer 41 should be determined based on the total number of the text subtitle stream files. For example, in order to ensure seamless presentation of a text subtitle when a user switches among subtitle stream files supporting two languages, the size of the subtitle preloading buffer 41 should be greater than or equal to 1 megabytes. The size of the subtitle preloading buffer 41 should be large enough to preload all the required text subtitle stream files at once.

The text subtitle streams are all preloaded in the buffer 41 and used, because the entire text subtitle stream can be recorded within a small capacity, as described above. Therefore, the text subtitle stream is recorded as a separate file, thereby facilitating the reading and usage of the text subtitle data only. Moreover, since the entire text subtitle data is preloaded to the buffer, the buffer can be controlled more easily. In a specific type of optical recording and reproducing apparatus, provided that a buffer underflow does not occur, the text subtitle stream may be reproduced in combination with the main AV data, in real-time, without preloading the text subtitle stream. Hereinafter, an example of the text subtitle stream being preloaded according to the present invention will now be given and described in detail.

The text subtitle decoding part 40 further includes a text subtitle decoder 42 which decodes one or more text subtitle streams stored in the subtitle preloading buffer 41, a graphics plane 43 converting the decoded subtitle stream(s) into displayable images, and a color look-up table (CLUT) 44 controlling the color information (Y, Cr and Cb values) and transparency information (T value) of the converted images.

An image superimposition part 50 included in the apparatus shown in FIG. 12A combines the images outputted from the video decoding part 20, the graphic decoding part 30, and the text subtitle decoding part 40. These combined images are displayed on a display screen. The video images outputted from the video plane 23 of the video decoding part 20 are displayed as a background of the display screen, and the images outputted from the graphic decoding part 30 and/or the text subtitle decoding part 40 are superimposed over the displayed video images. For example, if the output images of the graphic decoding part 30 are interactive graphic images, the text subtitle images outputted from the text subtitle decoding part 40 are initially superimposed over the video images by a first adder 52. Thereafter, the interactive graphic images are further superimposed over the subtitle-superimposed images by a second adder 53. The apparatus shown in FIG. 12A further includes a system decoder 4 for decoding input transport streams (e.g., MPEG transport streams), and a microprocessor 3 for controlling operations of all the mentioned components of the apparatus.

Reference will now be made in detail to a method for reproducing text subtitle streams according to the present invention. When an optical disc is preloaded by an optical disc player, an example of which is illustrated in FIG. 12A, information required for reproduction of data recorded on the disc is initially extracted from the disc and stored in a memory (not shown). When a particular title that associates with a PlayList is selected by a user, at least one complete (entire) text subtitle stream file designated in the PlayList file is initially preloaded into the subtitle preloading buffer 41 and font files related to the subtitle stream file is preloaded into the font preloading buffer 410.

For example, when a title that associates with the PlayList shown in FIG. 4 is selected by a user, text subtitle files for text subtitle clip No. 1 (Korean) and text subtitle clip No. 2 (English) are initially preloaded into the subtitle preloading buffer 41. Also, font files related to the text subtitle files, which may be designated in clip information files of the text subtitle clips, are preloaded into the font preloading buffer 410. Thereafter, playback of the PlayList is started. During the playback of the PlayList, AV streams of main AV clips No. 1 and 2 are decoded by the audio decoding part 10 and the video decoding part 20, respectively, and selected one of the preloaded text subtitle streams is decoded by the text subtitle decoder 42. Then the decoded text subtitle images are superimposed over the decoded main video images, and the entire images are displayed on a display screen.

As described above, when all operations are completed, and when the main video data that is controlled by the PlayItem is displayed onto the screen, the related text subtitle is superimposed through the image superimposition part 50 (shown in FIG. 12A). And, as the superimposed text subtitle is provided, the decoding of the text subtitle stream is initiated. Meanwhile, in order to perform decoding of the text subtitle stream, a region style information and palette information within the dialog style segment (DSS), which configures the first packet stream (PES), are separately read and stored for later usage when reproducing the DPS. Most particularly, when the palette information is read, the palette information is simultaneously provided to the CLUT 44, so as to provide the color and transparency desired by the user, when displaying the text subtitle onto the screen.

Figure 12B:
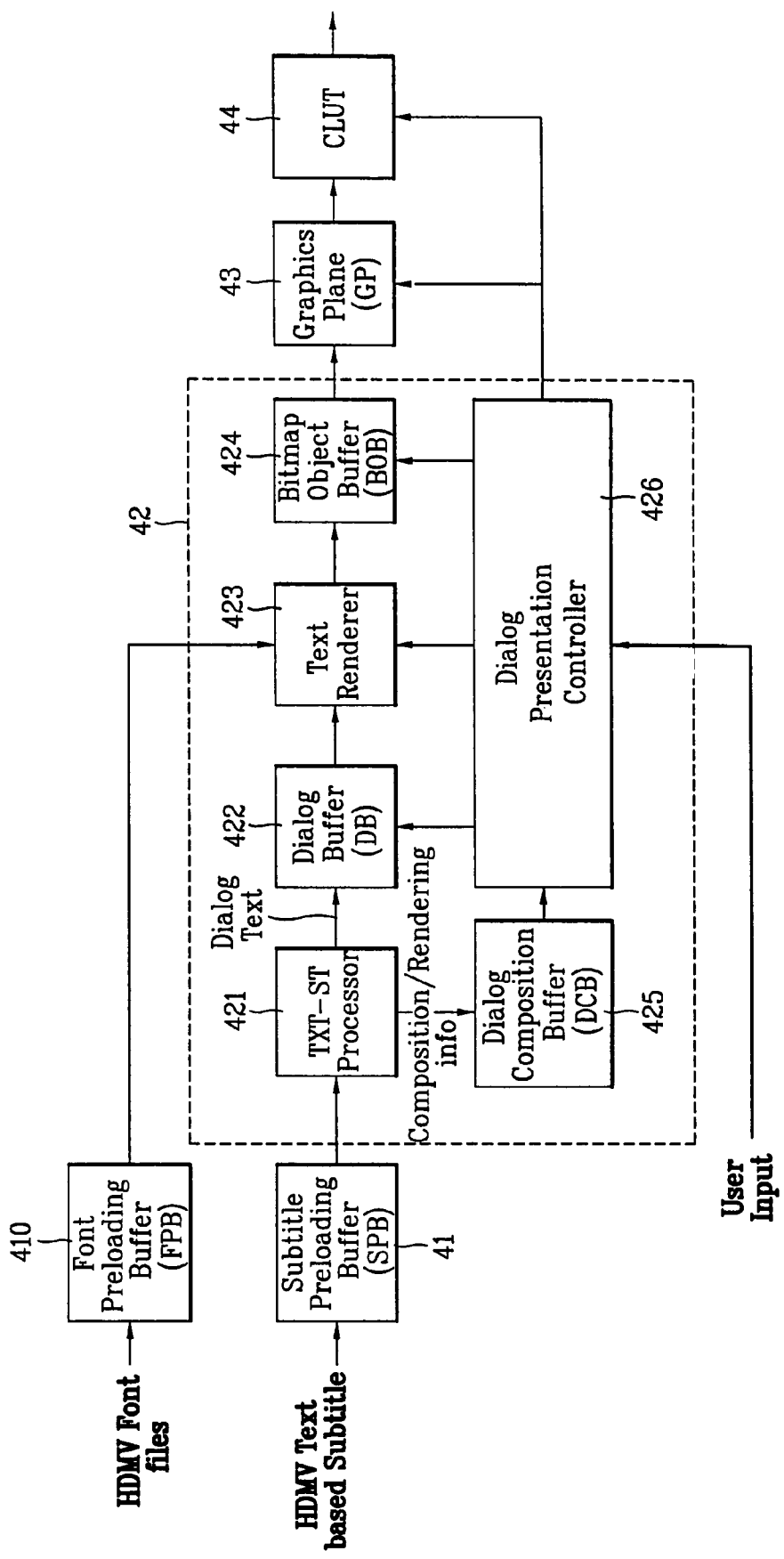

FIG. 12B illustrates the text subtitle decoder 42, shown in FIG. 12A, in more details. The decoding process performed by the text subtitle decoder 42 includes parsing, rendering, and composition steps. In the parsing step, the text subtitle stream(s) stored in the subtitle preloading buffer (SPB) 41 is parsed into composition information, rendering information, and dialog text data, in accordance with the information included in the dialog presentation segment (DPS). A dialog represents all the text subtitles that are displayed during a predetermined period of time, which may be defined by a presentation time stamp (PTS). Accordingly, the composition information corresponds to the information related to the display time and display position of the text subtitle when displayed onto the screen, and also to a new palette information that is newly defined by a palette information update (palette_update_flag=1b). The rendering information corresponds to the information that actually describe (or represent) the text of each region for each dialog. Such rendering information includes "region width & height", "Background color", "Text Flow", "Text Alignment", and "Font id/style/size". Furthermore, the dialog text information corresponds to an inline style information that is applied to the actual text data and a specific text string recorded within the DPS.

Referring to FIG. 12B a text subtitle processor 421 included in the text subtitle decoder 42 parses the subtitle stream file(s) stored in the subtitle preloading buffer 41 into composition and rendering information and dialog text data. The composition and rendering information is then stored in a dialog composition buffer (DCB) 425, and the dialog text data are stored in a dialog buffer (DB) 422. More specifically, a palette update information (palette_update_flag=1b) is included in the composition information, which is parsed by the parsing step. And, when palette_update_flag=0b, the common palette information, which was initially provided from the dialog style segment (DSS) to the CLUT 44, may be used continuously without being updated. Conversely, when palette_update_flag=1b, the common palette information within the DSS is ignored, and a new palette information is newly defined within the corresponding DPS and is updated to the CLUT 44 and used. However, when the presentation (or reproduction) of the corresponding DPS is completed, the palette update is cleared, and the common palette information initially provided from the CLUT 44 is used once again. At this point, the update of the CLUT 44 should be completed before the presentation (or reproduction) of the subsequent DPS.

In the rendering step, the parsed dialog text data are rendered into bitmap data using the rendering information, which represents style information required for rendering the dialog text data. A text renderer 423 renders the dialog text data stored in the dialog buffer 422 into bitmap data under control of a dialog presentation controller 426. In order to perform the rendering function, the text renderer 423 receives font data associated with the dialog text data from the font preloading buffer 410, receives rendering information and inline style information from the dialog presentation controller 426, and renders the dialog text data into bitmap data using the rendering information and inline style information, which is applicable for each text string of the dialog text data. Thereafter, the rendered text data are then stored in a bitmap object buffer (BOB) 424 as a bitmap object. Accordingly, the "Object" being recorded in the BOB buffer 424 corresponds to the text data of each region within each dialog, which is converted to a bitmap object. Therefore, a maximum of 2 objects for each region is parsed and stored within the BOB buffer 424.

Finally, in the composition step, the rendered text data are added into the graphics plane (GP) 43 according to the composition information, which represents information indicating time for displaying a text subtitle within the display screen. Finally, the bitmap object stored in the bitmap object buffer 424 is transferred (added) to the graphics plane 43 according to the composition information provided by the dialog presentation controller 426. The color look-up table 44 uses palette information included in the composition information to adjust color and transparency levels of an output of the graphics plane 43.

Accordingly, in presenting (or reproducing) continuous DPS #2, DPS #3, and DPS #4 that configure the continuous presentation set #2, as shown in FIG. 8C, the leading DPS #2 is presented by using all of the above-described presentation processes. Thereafter, in presenting DPS #3 and DPS #4, the region enabling the continuous presentation with DPS #3 and DPS #4 uses the same region style as that of the previous DPS #2. And so, in this case, the rendering process is omitted, and the information related to the previous DPS #2 within the graphic plane (GP) is preserved and used. More specifically, the graphic plane (GP) is preserved until the dialog_end_PTS of the DPS #$, wherein the continuous presentation is completed. However, when a discontinuous presentation of DPS #5 begins, the information within the graphic plane (GP) is entirely reset. Even though the DPS is a continuous presentation DPS within the continuous presentation set, a discontinuous region may be included, and in this case, the independent region should configure a bitmap object through a separate rendering process.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A non-transitory recording medium for storing a data structure, the data structure comprising:

at least one text subtitle stream, the text subtitle stream including a style segment and one or more presentation segments, the style segment defining at least one region style and the presentation segment containing at least one region of text linked to one of the at least one region style defined in the style segment by an identifier, wherein the presentation segment recorded or reproduced by a recording/reproducing device contains a continuous presentation flag to indicate that whether continuous presentation is required or not between a current presentation segment and a previous presentation segment, and a presentation time information indicating a start time of the presentation segment and an end time of the presentation segment, wherein the at least one region of text included in the presentation segment is linked to the at least one region style specifying a same text flow, wherein if the continuous presentation flag indicates that continuation presentation is required between the current presentation segment and the previous presentation segment, presentation of the at least one region of text in the previous presentation segment is preserved by the recording/reproducing device for presentation of the current presentation segment, wherein the at least one region of text including text data in which one of the at least one region style applied.

2. The recording medium of claim 1, wherein at least one of the plurality of presentation segments includes two regions of dialog text.

3. The recording medium of claim 1, wherein the continuous presentation flag is set to "0" to indicate that continuous presentation is not required for the presentation segment with previous one.

4. The recording medium of claim 1, wherein the continuous presentation flag is set to "1" to indicate that continuous presentation is required for the presentation segment with previous one.

5. The non-transitory recording medium of claim 1, wherein the continuous presentation flag further indicates continuous presentation between a region of text located in the current presentation segment and a region of text located in the previous presentation segment.

6. The recording medium of claim 5, wherein the presentation segment includes at least one pair of an inline style and a text string for at least one region of text.

7. The recording medium of claim 6, wherein the inline style for the respective one of the at least one region of text are identical to each other.

8. The recording medium of claim 5, wherein the region of text included in the current presentation segment is presented in a graphics plane by preserving presentation of the region of text included in the previous presentation segment in the graphics plane.

9. The recording medium of claim 1, wherein the start time of the current presentation segment and the end time of the previous presentation segment is identical if the continuous presentation is required between the current presentation segment and the previous presentation segment.

10. The recording medium of claim 1, wherein the continuous presentation segments under a continuous presentation, includes an identical region style identifier.

11. The recording medium of claim 1, wherein if a discontinuous presentation segment begins, the information related to the previous presentation segment within the graphic plane is reset.

12. A method for reproducing text subtitle stream, the method comprising:
  reading, by a device, a style segment and one or more presentation segments included in the text subtitle stream, the style segment defining at least one region style and the presentation segment containing at least one region of text linked to one of the at least one region style defined in the style segment by an identifier,
  the presentation segment containing a continuous presentation flag to indicate that whether continuous presentation is required or not between a current presentation segment and a previous presentation segment, and a presentation time information indicating a start time of the presentation segment and an end time of the presentation segment,
  the at least one region of text included in the presentation segment being linked to the at least one region style specifying a same text flow; and
  presenting the current presentation segment by preserving the at least one region of text of the previous presentation segment if the continuous presentation flag indicates that the continuation presentation is required between the current presentation segment and the previous presentation segment, wherein the at least one region of text including text data in which one of the at least one regions style applied.

13. The method of claim 12, wherein the presentation start time of the current presentation segment is identical to the presentation end time of the previous presentation segment, if the continuous presentation flag indicates that continuous presentation is required between the current and previous presentation segments.

14. An apparatus comprising:
  a buffer configured to preload a text subtitle stream, the preloaded text subtitle stream including a style segment and one or more presentation segments, the style segment defining at least one region style and the presentation segment containing at least one region of text linked to one of the at least one region style defined in the style segment by an identifier,
  the presentation segment containing a continuous presentation flag to indicate that whether continuous presentation is required or not between a current presentation segment and a previous presentation segment, and a presentation time information indicating a start time of the presentation segment and an end time of the presentation segment,
  the at least one region of text included in one presentation segment being linked to the at least one region style specifying a same text flow; and
  a text subtitle decoder configured to present the current presentation segment by preserving the at least one region of text of the previous presentation segment if the continuous presentation flag indicates that the continuation presentation is required between the current presentation segment and the previous presentation segment, wherein the at least one region of text including text data in which one of the at least one region style applied.

15. The apparatus of claim 14, wherein the presentation start time of the current presentation segment is identical to the presentation end time of the previous presentation segment, if the continuous presentation flag indicates that continuous presentation is required between the current and previous presentation segments.

16. The apparatus of claim 14, wherein if the buffer is configured to preload the text subtitle stream including the presentation segment which is discontinuously presented, the information related to the previous presentation segment within the graphic plane is reset.

17. A method for recording text subtitle stream, the method comprising:
  recording, by a device, at least one text subtitle stream, the text subtitle stream including a style segment and one or more presentation segments, the style segment defining at least one region style and the presentation segment containing at least one region of text linked to one of the at least one region style defined in the style segment by an identifier,
  wherein the presentation segment contains a continuous presentation flag to indicate that whether continuous presentation is required or not between a current presentation segment and a previous presentation segment, and a presentation time information indicating a start time of the presentation segment and an end time of the presentation segment,
  wherein the at least one region of text included in one presentation segment is linked to the at least one region style specifying a same text flow,
  wherein if the continuous presentation flag indicates that the continuation presentation is required between the current presentation segment and the previous presentation segment, presentation of the at least one region of text in the previous presentation segment is preserved for presentation of the current presentation segment, wherein the at least one region of text including text data in which one of the at least one region style applied.

18. The method of claim 17, wherein the continuous presentation flag is set to "0" to indicate that continuous presentation is not required for the presentation segment with previous one.

19. The method of claim 17, wherein the continuous presentation flag is set to "1" to indicate that continuous presentation is required for the presentation segment with previous one.

20. The method of claim 17, wherein the second presentation segment is not decoded.

21. The method of claim 17, wherein if a discontinuous dialog presentation segment begins, the information related to the previous dialog presentation segment within the graphic plane is reset.

22. The method of claim 17, wherein the continuous presentation flag further indicates continuous presentation between the region of text located in the current presentation segment and a region of text located in the previous presentation segment.

23. The method of claim 17, the method further comprising the step of storing the at least one text subtitle stream on a storage device.

24. The method of claim 17, wherein the start time of the current presentation segment and the end time of the previous presentation segment is identical if the continuous presentation is required between the current presentation segment and the previous presentation segment.

25. An apparatus for recording text subtitle streams, the apparatus comprising:
a pickup configured to record data on a recording medium; and
a controller configured to control the pickup to record at least one text subtitle stream, the text subtitle stream including a style segment and one or more presentation segments, the style segment defining at least one region style and the presentation segment containing at least one region of text linked to one of the at least one region style defined in the style segment by an identifier,
wherein the presentation segment contains a continuous presentation flag to indicate that whether continuous presentation is required or not between a current presentation segment and a previous presentation segment, and a presentation time information indicating a start time of the presentation segment and an end time of the presentation segment,
wherein the at least one region of text included in one presentation segment is linked to the region style specifying a same text flow,
wherein if the continuous presentation flag indicates that the continuation presentation is required between the current presentation segment and the previous presentation segment, presentation of the at least one region of text in the previous presentation segment is preserved for presentation of the current presentation segment, wherein the at least one region of text including text data in which one of the at least one region style applied.

26. The apparatus of claim 25, wherein the controller is configured to generate the current presentation segment which contains the continuous presentation flag being set to "0" to indicate that continuous presentation is not required for the presentation segment with previous one.

27. The apparatus of claim 25, wherein the controller is configured to generate the current presentation segment which contains the continuous presentation flag being set to "1" to indicate that continuous presentation is required for the presentation segment with previous one.

28. The apparatus of claim 25, wherein the controller is configured to generate the second presentation segment being not decoded.

29. The apparatus of claim 25, wherein if the controller is configured to record a discontinuous dialog presentation segment which begins, the information related to the previous dialog presentation segment within the graphic plane is reset.

30. The apparatus of claim 25, wherein the controller is configured to record the current presentation segment which contains the continuous presentation flag further indicating continuous presentation between a region of text located in the current presentation segment and a region of text located in the previous presentation segment.

31. The apparatus of claim 25, wherein the controller is configured to control the start time of the current presentation segment and the end time of the previous presentation segment being identical if the continuous presentation is required between the current presentation segment and the previous presentation segment.

32. An apparatus for reproducing text subtitle streams, the apparatus comprising:
a pickup configured to reproduce data on a recording medium; and
a controller configured to control the pickup to reproduce at least one text subtitle stream, the text subtitle stream including a style segment and one or more presentation segments, the style segment defining at least one region style and the presentation segment containing at least one region of text linked to one of the at least one region style defined in the style segment by an identifier,
wherein the presentation segment contains a continuous presentation flag to indicate that whether continuous presentation is required or not between a current presentation segment and a previous presentation segment, and a presentation time information indicating a start time of the presentation segment and an end time of the presentation segment,
wherein the at least one region of text included in one presentation segment is linked to the region style specifying a same text flow,
wherein if the continuous presentation flag indicates that the continuation presentation is required between the current presentation segment and the previous presentation segment, presentation of the at least one region of text in the previous presentation segment is preserved for presentation of the current presentation segment, wherein the at least one region of text including text data in which one of the at least one region style applied.

33. The apparatus of claim 32, wherein the controller is configured to control the start time of the current presentation segment and the end time of the previous presentation segment being identical if the continuous presentation is required between the current presentation segment and the previous presentation segment.

34. The apparatus of claim 32, wherein the controller is configured to reproduce the current presentation segment which contains the continuous presentation flag being set to "0" to indicate that continuous presentation is not required for the presentation segment with previous one.

35. The apparatus of claim 32, wherein the controller is configured to reproduce the current presentation segment which contains the continuous presentation flag being set to "1" to indicate that continuous presentation is required for the presentation segment with previous one.

36. The apparatus of claim 32, wherein if the controller is configured to reproduce a discontinuous dialog presentation segment which begins, the information related to the previous dialog presentation segment within the graphic plane is reset.

37. The apparatus of claim 32, wherein the controller is configured to reproduce the current presentation segment which contains the continuous presentation flag further indicating continuous presentation between the region of text located in the current presentation segment and region of text located in the previous presentation segment.

* * * * *